US008955094B2

(12) United States Patent
Readshaw (10) Patent No.: US 8,955,094 B2
(45) Date of Patent: Feb. 10, 2015

(54) USER SESSION MANAGEMENT FOR WEB APPLICATIONS

(75) Inventor: Neil I. Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 2887 days.

(21) Appl. No.: 11/333,418

(22) Filed: Jan. 17, 2006

(65) Prior Publication Data

US 2007/0169185 A1    Jul. 19, 2007

(51) Int. Cl.
*H04L 29/06*    (2006.01)
*H04L 29/08*    (2006.01)

(52) U.S. Cl.
CPC ........ *H04L 63/0281* (2013.01); *H04L 63/0884* (2013.01); *H04L 63/0815* (2013.01); *H04L 63/168* (2013.01); *H04L 67/14* (2013.01)
USPC ............................................. 726/12; 713/189

(58) Field of Classification Search
CPC . H04L 63/0281; H04L 63/0884; H04L 67/14; H04L 63/0815; H04L 63/168
USPC ................... 726/11–12; 370/34–430; 705/79; 709/238–244; 713/153–154
See application file for complete search history.

(56) References Cited

U.S. PATENT DOCUMENTS

| | | | | |
|---|---|---|---|---|
| 5,928,363 A | * | 7/1999 | Ruvolo | 726/22 |
| 6,092,196 A | * | 7/2000 | Reiche | 726/6 |
| 6,349,336 B1 | * | 2/2002 | Sit et al. | 709/227 |
| 6,763,468 B2 | * | 7/2004 | Gupta et al. | 726/2 |
| 6,775,687 B1 | | 8/2004 | Binding et al. | |
| 7,509,425 B1 | * | 3/2009 | Rosenberg | 709/227 |
| 7,600,230 B2 | * | 10/2009 | Desai et al. | 719/311 |
| 7,643,442 B1 | * | 1/2010 | Calhoun | 370/328 |
| 7,685,295 B2 | * | 3/2010 | Myers et al. | 709/228 |
| 2001/0056411 A1 | | 12/2001 | Lindskog et al. | |
| 2002/0104022 A1 | * | 8/2002 | Jorgenson | 713/201 |
| 2003/0033367 A1 | * | 2/2003 | Itoh | 709/203 |
| 2003/0140113 A1 | * | 7/2003 | Balasuriya | 709/217 |
| 2003/0226036 A1 | | 12/2003 | Bivens et al. | |
| 2004/0068573 A1 | * | 4/2004 | Corbeil | 709/229 |
| 2005/0251856 A1 | * | 11/2005 | Araujo et al. | 726/12 |
| 2005/0262357 A1 | * | 11/2005 | Araujo et al. | 713/182 |
| 2005/0273849 A1 | * | 12/2005 | Araujo et al. | 726/12 |
| 2006/0010442 A1 | * | 1/2006 | Desai et al. | 718/100 |
| 2006/0020704 A1 | * | 1/2006 | Balasuriya | 709/227 |
| 2006/0026286 A1 | * | 2/2006 | Lei et al. | 709/227 |
| 2007/0117548 A1 | * | 5/2007 | Fernandez-Alonso et al. | 455/414.1 |
| 2008/0028458 A1 | * | 1/2008 | Masuhiro et al. | 726/14 |

OTHER PUBLICATIONS

Nystrom; draft-nystrom-http-sasl-11.txt; Internet-Draft; IETF, Apr. 2004; pp. 1-42.*
Non-Patent Literature "draft-nystrom-http-sasl-11.txt".*

(Continued)

*Primary Examiner* — David Garcia Cervetti
(74) *Attorney, Agent, or Firm* — Jeffrey S. LaBaw; David H. Judson (57) ABSTRACT

Methods, systems, and products are provided for user session management for web applications. Embodiments include identifying, by a web application, a user session directive and sending, from the web application to a proxy web security component, an instruction to implement the user session directive. Typical embodiments also include receiving, by the proxy web security component, the instruction to implement the user session directive and implementing, by the proxy web security component, the user session directive.

24 Claims, 5 Drawing Sheets

(56) References Cited

OTHER PUBLICATIONS

Oracle Application Server Web Cache, Administrator's Guide, Dec. 2004, http://download.oracle.com/docs/cd/B14099_02/caching.1012/b14046.pdf.*

Nystrom; draft-nystrom-http-sas1-11.txt; Internet-Draft; IETF, Apr. 2004; pp. 1-42.

Nystrom; draft-nystrom-http-sasl-07.txt; Internet-Draft; IETF; Jun. 2003; pp. 1-33.

* cited by examiner

USER SESSION MANAGEMENT FOR WEB APPLICATIONS

BACKGROUND OF THE INVENTION

1. Field of the Invention

The field of the invention is data processing, or, more specifically, methods, systems, and products for user session management for web applications.

2. Description of Related Art

Web applications delivered via the HTTP protocol represent the most popular application development architecture in practice today. The majority of these web applications comply with a security policy that includes authentication and authorization. Security policies are often implemented for web application by third party security vendors that are separate entities from those implementing the web applications. Such security vendors implement uniform security policies across many web applications. The third party security vendor relieves the web applications from the complexity of implementing security management functions. These third party security vendors often provide single sign-on, where the user authenticates to the security vendor, and the security vendor asserts that identity to the supported web applications in a trusted fashion.

As web applications become more sophisticated and complex, these web applications can no longer be passive consumers of pre-established security policy. Examples include cases where a web application determines that a specific aspect of a user session requires additional or customized security measures not currently implemented by the third party security vendor according to its current security policy. There is therefore an ongoing need for a method, system, and computer program product for user session management for web applications that allows a web application to trigger security directives.

SUMMARY OF THE INVENTION

Methods, systems, and products are provided for user session management for web applications. Embodiments include identifying, by a web application, a user session directive and sending, from the web application to a proxy web security component, an instruction to implement the user session directive. Typical embodiments also include receiving, by the proxy web security component, the instruction to implement the user session directive and implementing, by the proxy web security component, the user session directive.

Sending, from the web application to a proxy web security component, an instruction to implement the user session directive may be carried out by sending an HTTP response message containing a value instructing a proxy web security component to implement the user session directive. Sending an HTTP response message containing a value instructing a proxy web security component to implement the user session directive may be carried out by inserting the value instructing the proxy web security component to implement the user session in a Pragma header field.

Identifying a user session directive may be carried out by identifying a directive to re-authenticate the user. Implementing the user session directive may be carried out by re-authenticating the user.

Identifying a user session directive may be carried out by identifying a directive to re-authenticate the user using a different authentication method than previously implemented in the same user session. Implementing the user session directive may be carried out by re-authenticating the user using a different authentication method than previously implemented in the same user session.

Identifying a required user session directive may be carried out by identifying a directive to terminate the user session. Implementing the user session directive may be carried out by terminating the user session.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
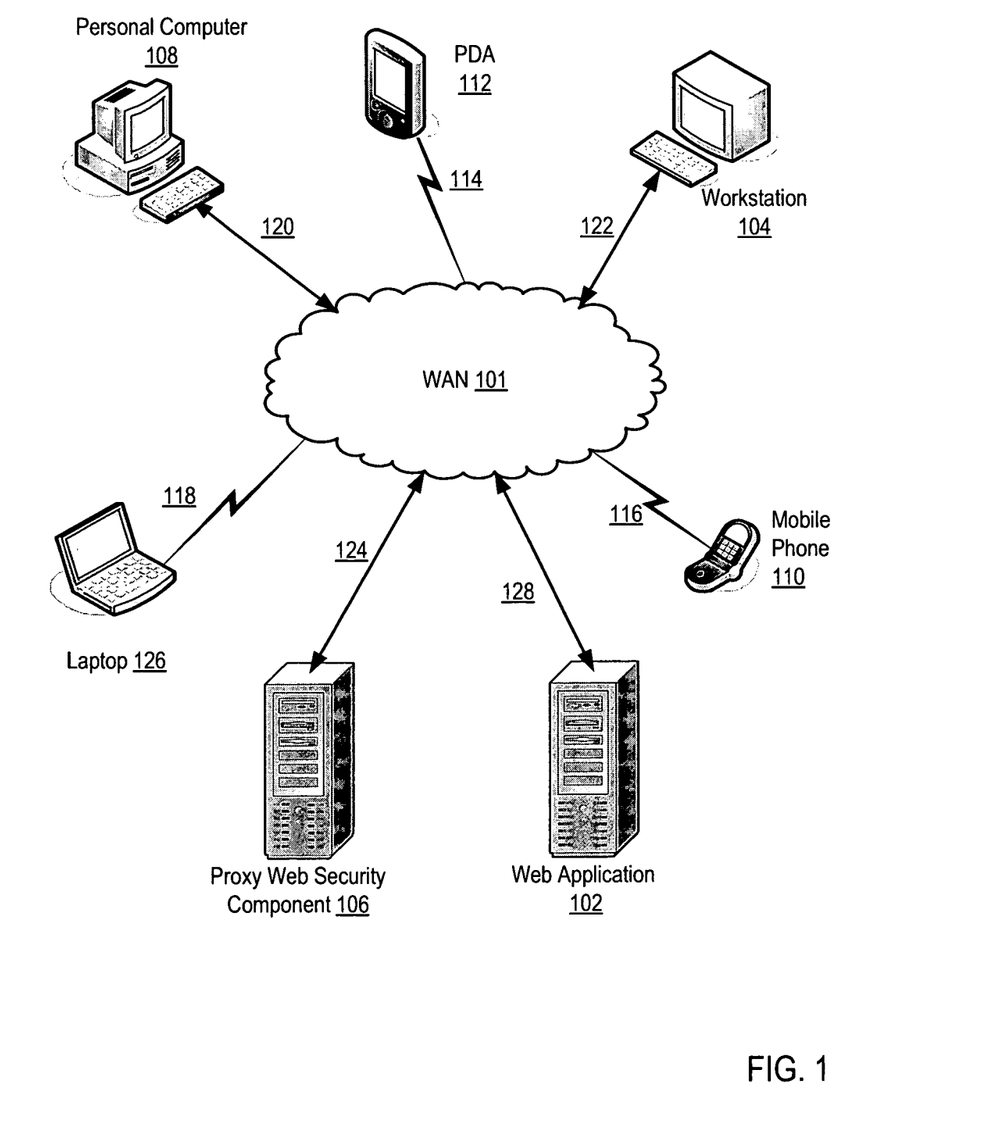
FIG. 1 sets forth a network diagram illustrating an exemplary system for user session management for web applications according to embodiments of the present invention.

Exemplary methods, systems, and products for user session management for web applications according to embodiments of the present invention are described with reference to the accompanying drawings, beginning with FIG. 1. FIG. 1 sets forth a network diagram illustrating an exemplary system for user session management for web applications according to embodiments of the present invention. The system of FIG. 1 includes wide area network ("WAN"). In the example of FIG. 1, several exemplary computers including a personal computer (108), PDA (112), a computer workstation (104), a mobile phone (110), a laptop (126), a server supporting a proxy web security component (106), and a server supporting a web application (102) are connected to the WAN (101). Network-enabled mobile phone (110) connects to the WAN (101) through a wireless link (116), the laptop (126) connects to the WAN (101) through a wireless link (118), and the PDA (112) connects to the WAN (101) through a wireless link (114). In the example of FIG. 1, the personal computer (108) connects to the WAN (101) through a wireline connection (120), the computer workstation (104) connects to the WAN (101) through a wireline connection (122), the server supporting the proxy web security component (106) connects to the WAN (101) through a wireline (124) connection, and the server supporting the web application (102) connects to the WAN (101) through a wireline (128) connection.

In the example of FIG. 1, several exemplary client computers including the personal computer (108), the PDA (112), the computer workstation (104), the mobile phone (110), and the laptop (126) are capable of requesting resources from the web application (102) running on a web server. A web application is an application that delivers resources to users from a web server over a network such as the World Wide Web or an intranet. Web applications are used to implement webmail, online retail sales, online auctions, discussion boards, weblogs, and many other functions as will occur to those of skill in the art.

A resource may be any computer resource whose location may be specified by a URL. That is, in this specification 'computer resource' or 'resource' refers to any aggregation of information identified by URL. In fact, the 'R' in 'URL' stands for 'resource.' Network communications protocols generally, for example, HTTP, TCP/IP, and so on, transmit resources, not just files. The most common kind of resource is a file, but resources include dynamically-generated query results as well, such as the output of CGI ('Common Gateway Interface') scripts, Java servlets, dynamic server pages, documents available in several languages, and so on. In effect, a resource is somewhat similar to a file, but more general in nature. Resources implemented as files include static web pages, graphic image files, video clip files, audio clip files, and so on. As a practical matter, most resources are currently either files or server-side script output. Server side script output includes output from CGI programs, Java servlets, Active Server Pages, Java Server Pages, and so on.

Resources provided by web applications are typically requested by use of web browsers and each of the client devices of FIG. 1 (108, 112, 104, 110, and 126) are capable of supporting a web browser. 'Browser,' as the term is used in this specification, generally means a web browser, a software application for locating, requesting, retrieving, and displaying computer resources in the form of static or dynamic web pages or server-side scripting output. Browsers typically comprise both a markup language interpreter, web page display routines, and an HTTP communications client. Typical browsers today can display text, graphics, audio and video. Browsers are operative in any computer capable of data communications including web-enabled devices, wireless web-enabled devices, microcomputers, PDAs, laptops, and so on. Browsers in wireless web-enabled devices often are downsized browsers called "microbrowsers." Browsers typically support not only HTML (the 'HyperText Markup Language'), but other markup languages as well, including for example, XML (the 'eXtensible Markup Language'), and, in the case of wireless web-enabled devices, WML (the 'Wireless Markup Language') and HDML (the 'Handheld Device Markup Language').

In the example of FIG. 1, the web application (102) provides resources to users in accordance with a security policy implemented by the proxy web security component (106). The proxy web security component of FIG. 1 is a centralized web security policy management module implementing security policies for web applications including authentication of users and authorization of users to resources. Although the example of FIG. 1 includes only one web application, proxy web security component are capable of implementing security policies for a number of web applications thereby providing centralized web security policy management.

One proxy web security component currently available is IBM Tivoli Access Manager WebSEAL™. IBM Tivoli Access Manager WebSEAL is a resource manager responsible for managing and protecting Web-based information and resources such as those provided by web applications. WebSEAL is a high performance, multi-threaded Web server that applies fine-grained security policy to supported web applications. WebSEAL typically acts as a reverse Web proxy by receiving HTTP/HTTPS requests from a Web browser and delivering content from its own Web server or from supported web application servers.

Requests passing through WebSEAL are evaluated by the Tivoli Access Manager. The Tivoli Access Manager includes an authentication framework that provides a wide range of built-in authenticators and supports external authenticators. The Tivoli Access Manager also includes an authorization framework accessed through an application programming interface ('API') that provides permit and deny decisions to users on requests for resources from supported web applications.

The system of FIG. 1 operates generally to provide user session management for web applications according to embodiments of the present invention by identifying, by a web application (102), a user session directive. A user session directive is an instruction to a proxy web security component to perform a task specific to a current user session. Examples of user session directive include instructions to re-authenticate the user, instructions to re-authenticate the user using a different authentication method than previously implemented in the same user session, instructions to terminate the user session, instructions to switch from one user to another user, instructions to switch back to a previous user, instructions to initiate a change password operation, and others as will occur to those of skill in the art.

The system of FIG. 1 also operates generally to provide user session management for web applications according to embodiments of the present invention by sending, from the web application (102) to a proxy web security component (106), an instruction to implement the user session directive. Sending, from the web application to a proxy web security component, an instruction to implement the user session directive may be carried out by sending an HTTP response message containing a value instructing a proxy web security component to implement the user session directive as discussed in more detail below with reference to FIG. 4.

The system of FIG. 1 also operates generally to provide user session management for web applications according to embodiments of the present invention by receiving, by the proxy web security component (106), the instruction to implement the user session directive and implementing, by the proxy web security component (106), the user session directive. Examples of implementing user session directives include re-authenticating the user upon instruction of the web application (102), re-authenticating the user using a different authentication method than previously implemented in the same user session upon instruction of the web application (102), terminating the user session upon instruction of the web application and others as will occur to those of skill in the art.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

As discussed above, web applications typically provide requested resources to users in accordance with a security policy implemented by the proxy web security component. For further explanation, therefore, FIG. 2 sets forth a block diagram of a system for user session management for web applications that includes a browser (414) coupled for data communications with a proxy web security component (118) that is in turn coupled for data communication with a web application (102).

Figure 2:
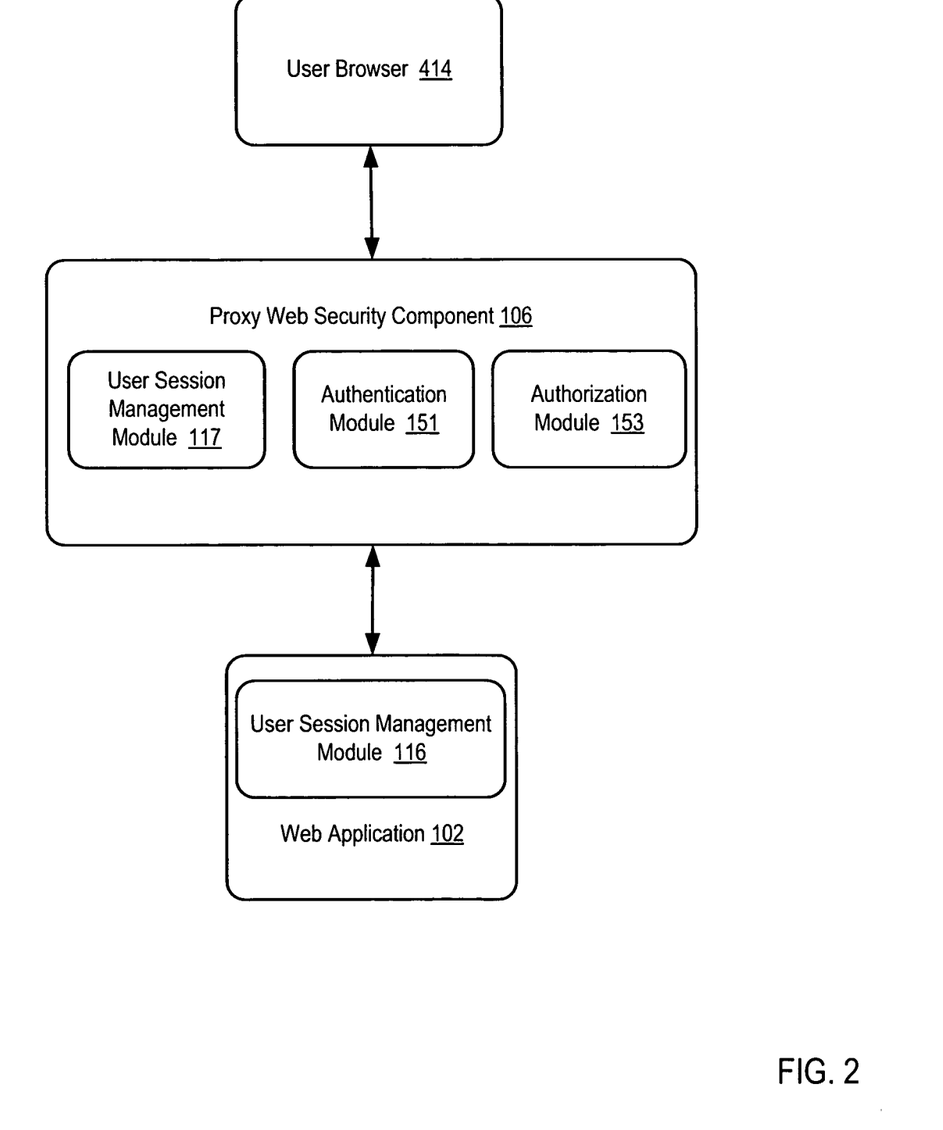
FIG. 2 sets forth a block diagram of a system for user session management for web applications according to embodiments of the present invention.

The web application (102) of FIG. 2 includes a user session management module (116) according to the present invention. The user session management module (116) includes computer program instructions for identifying a user session directive and sending an instruction to implement the user session directive to a proxy web security component (106). Examples of user session directive include instructions to re-authenticate the user, instructions to re-authenticate the user using a different authentication method than previously implemented in the same user session, instructions to terminate the user session, instructions to switch from one user to another user, instructions to switch back to a previous user, instructions to initiate a change password operation, and others as will occur to those of skill in the art.

The proxy web security component (106) of FIG. 2 includes a user session management module (117) according to the present invention. The user session management module (117) includes computer program instructions for receiving the instruction to implement the user session directive and implementing the user session directive. Examples of implementing user session directives include re-authenticating the user upon instruction of the web application (102), re-authenticating the user using a different authentication method than previously implemented in the same user session upon instruction of the web application (102), terminating the user session upon instruction of the web application and others as will occur to those of skill in the art.

The proxy web security component (106) of FIG. 2 includes an authentication module (151) that authenticates users requesting resources from the web application (102) through use of a user browser (414) in accordance with a security policy implemented by the proxy web security component (106). Authentication is the process of verifying that a user, person or process, is who the user claims to be. Proxy web security components often support more than one authentication method. Examples of authentication methods include methods that confirm usernames and passwords, methods that confirm smartcards, methods that identify biometric information from users such as, for example, retina scans, voice recognition methods, or fingerprint recognition methods and other authentication methods that will occur to those of skill in the art.

The proxy web security component (106) of FIG. 2 includes an authorization module (153) that authorizes particular user requests for resources from the web application (102) in accordance with a security policy implemented by the proxy web security component (106). Authorization is the process of permitting or denying an authenticated user access to a resource.

User session management for web applications in accordance with the present invention is generally implemented with computers, that is, with automated computing machinery. In the system of FIG. 1, for example, all the nodes, servers, and communications devices are implemented to some extent at least as computers. For further explanation, therefore, FIG. 3 sets forth a block diagram of automated computing machinery comprising an exemplary computer (152) useful in user session management for web applications according to embodiments of the present invention. The computer (152) of FIG. 3 includes at least one computer processor (156) or 'CPU' as well as random access memory (168) ('RAM') which is connected through a system bus (160) to processor (156) and to other components of the computer.

Figure 3:
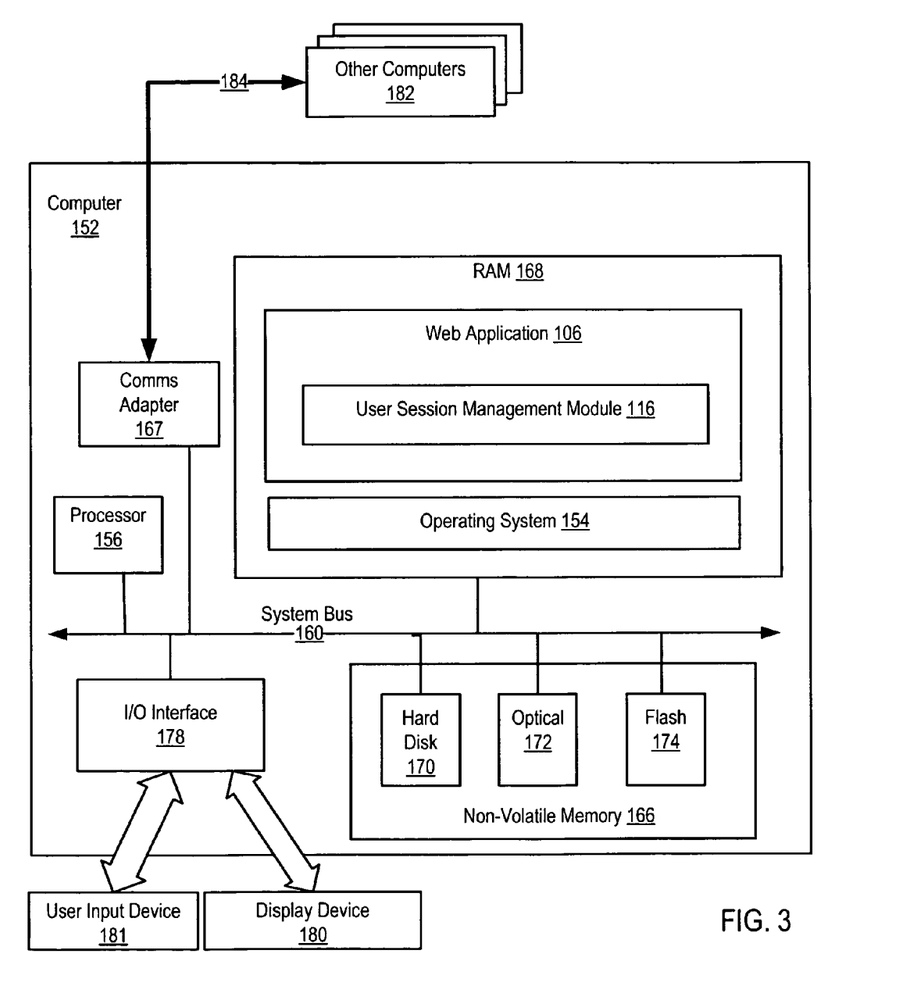
FIG. 3 sets forth a block diagram of automated computing machinery comprising an exemplary computer useful in user session management for web applications according to embodiments of the present invention.

Stored in RAM (168) is a web application (106) including a user session management module (116), computer program instructions for identifying a user session directive and sending an instruction to implement the user session directive to a proxy web security component.

Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154), web application (106), and user session management module (116) in the example of FIG. 3 are shown in RAM (168), but many components of such software typically are stored in non-volatile memory (166) also.

Computer (152) of FIG. 3 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 3 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 4:
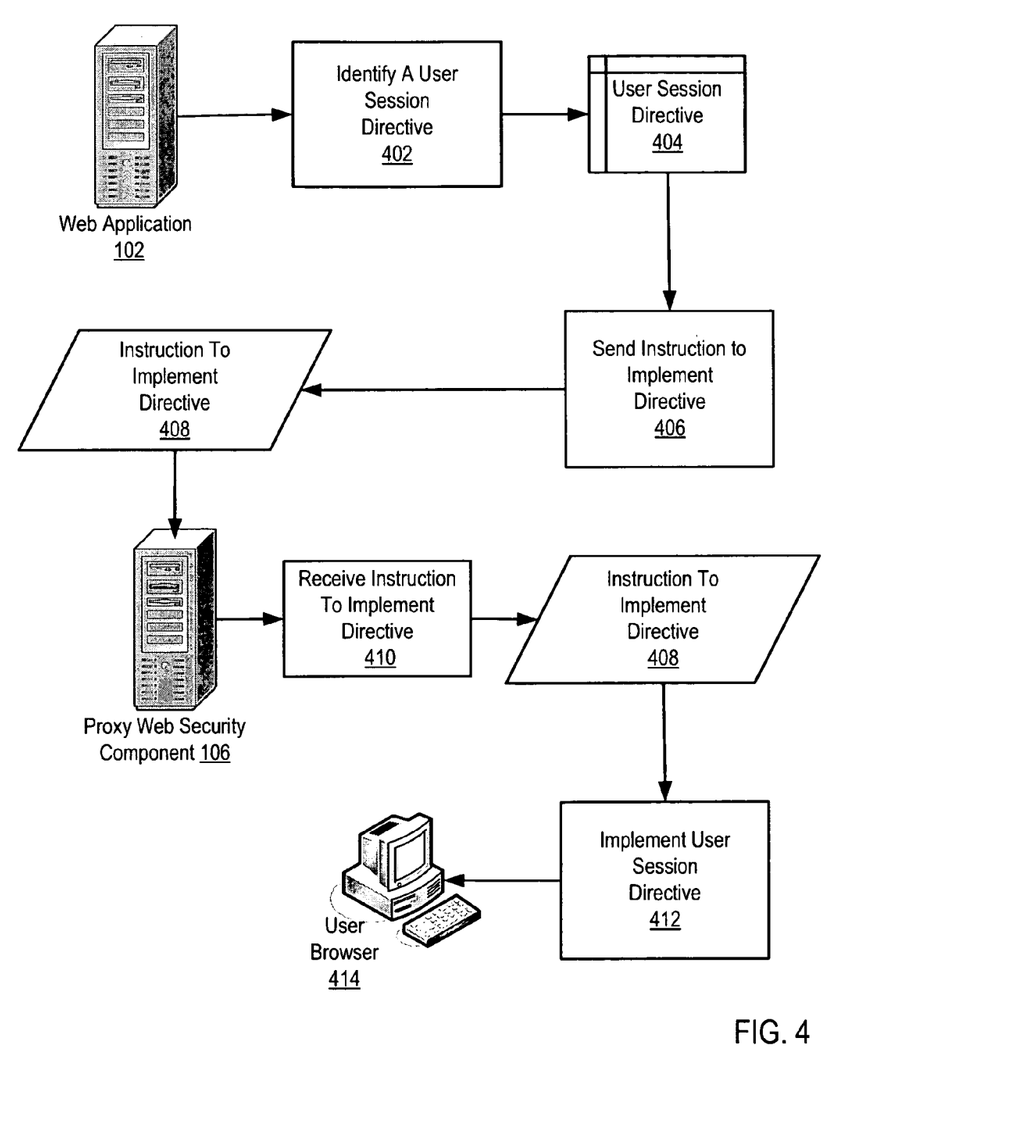
FIG. 4 sets forth a flow chart illustrating an exemplary method for user session management for web applications according to embodiments of the present invention.

For further explanation, FIG. 4 sets forth a flow chart illustrating an exemplary method for user session management for web applications according to embodiments of the present invention that includes identifying (402), by a web application (102), a user session directive (404). As discussed above, a user session directive is an instruction to a proxy web security component to perform a task specific to a current user session.

Identifying (402) a user session directive (404) may be carried out by identifying a directive to re-authenticate the user. A directive to re-authenticate the user is typically implemented as an instruction to a proxy web security component to authenticate the user with the same authentication method previously used in the same user session.

As discussed above, proxy web security components often support more than one authentication method. Examples of authentication methods include methods that confirm usernames and passwords, methods that confirm smartcards, methods that identify biometric information from users such as, for example, retina scans, voice recognition methods, or fingerprint recognition methods and other authentication methods that will occur to those of skill in the art. Identifying (402) a user session directive (404), therefore, may be carried out by identifying a directive to re-authenticate the user using a different authentication method than previously implemented in the same user session.

Identifying (402) a required user session directive (404) may be carried out by identifying a directive to terminate the user session. A directive to terminate the user session is typically implemented as an instruction to a proxy web security component to terminate the user session.

The method of FIG. 4 also includes sending (406), from the web application (102) to a proxy web security component (106), an instruction (408) to implement the user session directive (404). Sending (406), from the web application (102) to a proxy web security component (106), an instruction (408) to implement the user session directive (404) may be carried out by sending a Hypertext Transfer Protocol ('HTTP') response message containing a value instructing a proxy web security component to implement the user session directive. The Hypertext Transfer Protocol (HTTP) is an application-level protocol for distributed, collaborative, hypermedia information systems. HTTP is a generic, stateless, protocol which can be used for many tasks beyond its use for hypertext, such as name servers and distributed object management systems, through extension of its request methods, error codes and headers. The standard HTTP 1.1 protocol supports a general header filed called the 'Pragma' header field. The Pragma header is used to include implementation specific directives that may apply to any recipient along the HTTP request/response chain. Such implementation specific directives often include information not formally defined in the HTTP specification. The most commonly used value used by a Pragma header is 'nocache' which instructs a supporting web client to not cache the content contained in the HTTP message.

Sending an HTTP response message containing a value instructing a proxy web security component to implement the user session directive according to the method of FIG. 4 may therefore be carried out by inserting the value instructing the proxy web security component to implement the user session directive in a Pragma header field. The value instructing the proxy web security component to implement the user session directive is typically a value uniquely identifying a particular user session directive to be implemented by a proxy web security component. For example, a unique value may be assigned to the user directive to re-authenticate a user, to re-authenticate the user using a different authentication method than previously implemented in the same user session, and to terminate the user session.

The method of FIG. 4 also includes receiving (410), by the proxy web security component (106), the instruction (408) to implement the user session directive (404). Receiving (410), by the proxy web security component (106), the instruction (408) to implement the user session directive (404) may be carried out by receiving an HTTP response message from a web application and identifying a value in a Pragma header of the HTTP response message identifying a particular user session directive.

The method of FIG. 4 also includes implementing (412), by the proxy web security component (106), the user session directive (404) identified by the web application. Implementing (412) the user session directive (404) may be carried out by re-authenticating the user. Re-authenticating the user is typically carried out by authenticating the user using the same authentication method user previously in the same user session.

As discussed above, proxy web security components often support more than one authentication method. Implementing (412) the user session directive (404) may be carried out by re-authenticating the user using a different authentication method than previously implemented in the same user session.

Implementing (412) the user session directive (404) may be carried out by terminating the user session. Terminating the session may also include sending a message to the user informing the user that the session has been terminated.

Figure 5:
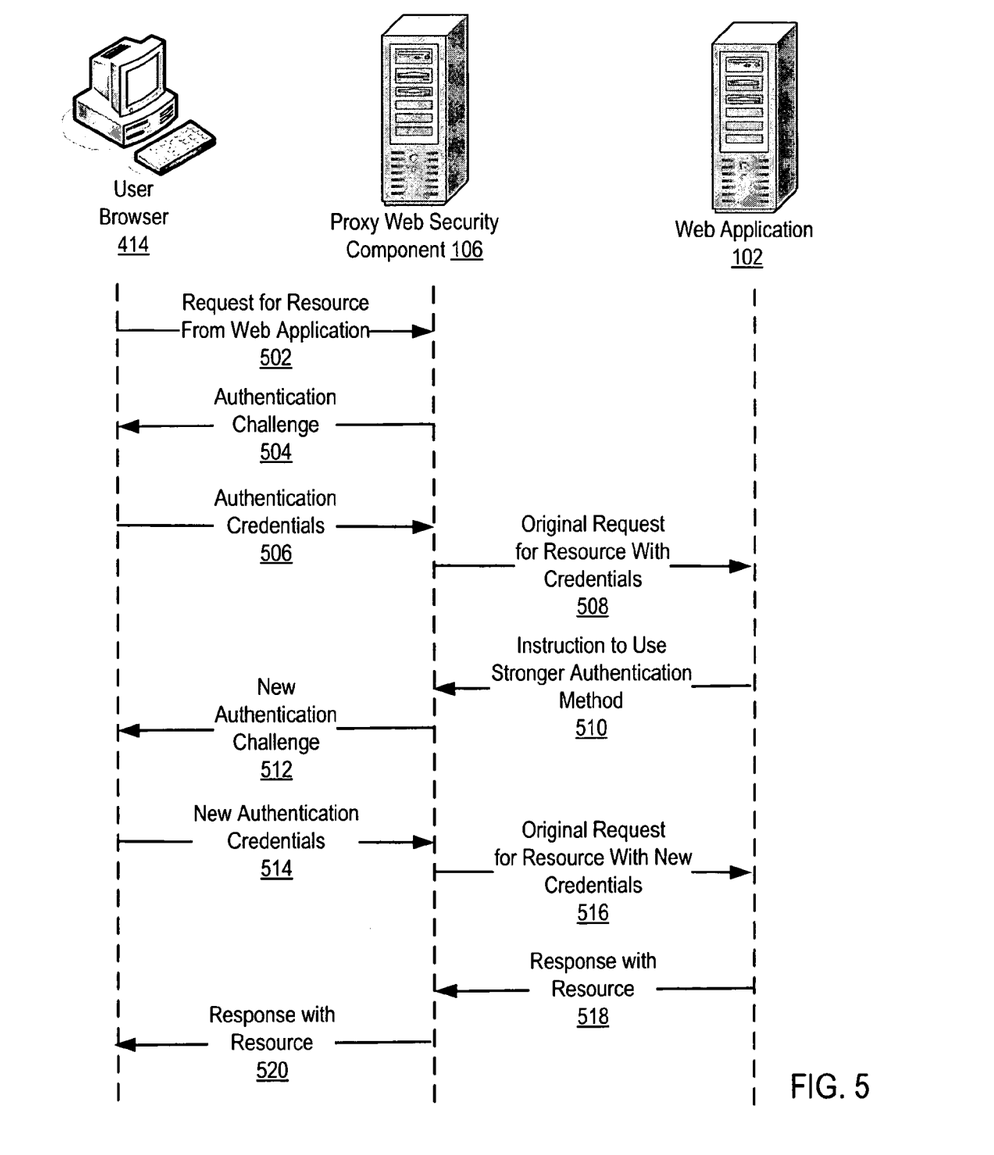
FIG. 5 sets forth a calling sequence diagram illustrating an exemplary use case of the method of FIG. 4.

For further explanation, FIG. 5 sets forth a calling sequence diagram illustrating an exemplary use case of the method of FIG. 4. In the example of FIG. 5 a user requests a resource on a web application (102). The request (502) is sent from the user browser (414) to a proxy web security component (106) implementing security policies for the web application (102).

In response to receiving the request (502) for the resource from the web application (102), the proxy web security component (106) issues an authentication challenge (504) to the user. In response to the authentication challenge (504), the user provides authentication credentials (506) to the proxy web security component (106).

In the example of FIG. 5, the proxy web security component (106) authenticates the user by determining that the authentication credentials (506) are valid and forwards (508) the original request (502) for resource with the credentials (506) to the web application (102).

In the example of FIG. 5, the web application (102) identifies a user session directive to use a stronger authentication method and sends an instruction (510) to use a stronger authentication method to the proxy web security component (106). The proxy web security component (106) receives the instruction (510) to use a stronger authentication method and implements the user session directive by issuing a new authentication challenge (512).

In response to receiving the new authentication challenge (512), a user sends to the proxy web security component (106) new authentication credentials. The proxy web security component (106) determines that the new authentication credentials (514) are valid and forwards (516) the original request (502) for a resource with the new authentication credentials (514) to the web application (102).

In response to being forwarded (516) the request (502) with the new authentication credentials (514), the web application (102) sends a response (518) containing the requested resource to the proxy web security component (106). The proxy web security component (106) forwards (520) the response with the resource to the user web browser (414).

Exemplary embodiments of the present invention are described largely in the context of a fully functional computer system for user session management for web applications. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for user session management for web applications, the method comprising method steps performed by executing, by a computer processor, computer programming instructions stored in a recordable medium, the method steps comprising:
    identifying, by a web application, a user session directive, the user session directive being an instruction to a web proxy security component to perform a task specific to an existing user session, the user session directive comprising a directive to re-authenticate the user;
    sending, from the web application to the proxy web security component, an instruction to implement the user session directive within the existing user session;
    receiving, by the proxy web security component, the instruction to implement the user session directive; and
    implementing, by the proxy web security component, the user session directive within the existing user session.

2. The method of claim 1 wherein implementing the user session directive further comprises re-authenticating the user.

3. The method of claim 1 wherein the user session directive comprises a directive to re-authenticate the user using a different authentication method than previously implemented in the same user session.

4. The method of claim 3 wherein implementing the user session directive further comprises re-authenticating the user using a different authentication method than previously implemented in the same user session.

5. The method of claim 1 wherein the user session directive comprises a directive to terminate the user session.

6. The method of claim 5 wherein implementing the user session directive further comprises terminating the user session.

7. The method of claim 1 wherein sending, from the web application to a proxy web security component, an instruction to implement the user session directive further comprises sending an HTTP response message containing a value instructing a proxy web security component to implement the user session directive.

8. The method of claim 7 wherein sending an HTTP response message containing a value instructing a proxy web security component to implement the user session directive further comprises inserting the value instructing the proxy web security component to implement the user session directive in a Pragma header field.

9. A system for user session management for web applications, the system comprising:
    a first computer processor;
    a first computer memory operatively coupled to the first computer processor, the first computer memory having disposed within it a web application including computer program instructions capable of:
    identifying a user session directive, the user session directive being an instruction to a web proxy security component to perform a task specific to an existing user session, the user session directive comprising a directive to re-authenticate the user; and
    sending, to the proxy web security component, an instruction to implement the user session directive within the existing user session;
    a second computer processor; and
    a second computer memory operatively coupled to the second computer processor, the second computer memory having disposed within it the proxy web security component including computer program instructions capable of:
    receiving, by the proxy web security component, the instruction to implement the user session directive; and
    implementing, by the proxy web security component, the user session directive within the existing user session.

10. The system of claim 9 wherein computer program instructions capable of implementing the user session directive further comprise computer program instructions capable of re-authenticating the user.

11. The system of claim 9 wherein computer program instructions capable of identifying a user session directive further comprise computer program instructions capable of identifying a directive to re-authenticate the user using a different authentication system than previously implemented in the same user session.

12. The system of claim 11 wherein computer program instructions capable of implementing the user session directive further comprise computer program instructions capable of re-authenticating the user using a different authentication method than previously implemented in the same user session.

13. The system of claim 9 wherein computer program instructions capable of identifying a required user session directive further comprise computer program instructions capable of identifying a directive to terminate the user session.

14. The system of claim 13 wherein computer program instructions capable of implementing the user session directive further comprise computer program instructions capable of terminating the user session.

15. The system of claim 9 wherein computer program instructions capable of sending an instruction to implement the user session directive further comprise computer program instructions capable of sending an HTTP response message containing a value instructing a proxy web security component to implement the user session directive.

16. The system of claim 15 wherein computer program instructions capable of sending an HTTP response message containing a value instructing a proxy web security component to implement the user session directive further comprise computer program instructions capable of inserting the value instructing the proxy web security component to implement the user session directive in a Pragma header field.

17. A computer program product embodied on a tangible computer-readable storage medium for user session management for web applications, the computer program product comprising:

computer program instructions for identifying a user session directive, the user session directive being an instruction to a web proxy security component to perform a task specific to an existing user session, the user session directive comprising a directive to re-authenticate the user;

computer program instructions for sending, to the proxy web security component, an instruction to implement the user session directive within the existing user session;

computer program instructions for receiving, by the proxy web security component, the instruction to implement the user session directive; and computer program instructions for implementing, by the proxy web security component, the user session directive within the existing user session.

18. The computer program product of claim 17 wherein computer program instructions for implementing the user session directive further comprise computer program instructions for re-authenticating the user.

19. The computer program product of claim 17 wherein computer program instructions for identifying a user session directive further comprise computer program instructions for identifying a directive to re-authenticate the user using a different authentication computer program product than previously implemented in the same user session.

20. The computer program product of claim 19 wherein computer program instructions for implementing the user session directive further comprise computer program instructions for re-authenticating the user using a different authentication computer program product than previously implemented in the same user session.

21. The computer program product of claim 17 wherein computer program instructions for identifying a required user session directive further comprise computer program instructions for identifying a directive to terminate the user session.

22. The computer program product of claim 21 wherein computer program instructions for implementing the user session directive further comprise computer program instructions for terminating the user session.

23. The computer program product of claim 17 wherein computer program instructions for sending, from the web application to a proxy web security component, an instruction to implement the user session directive further comprise computer program instructions for sending an HTTP response message containing a value instructing a proxy web security component to implement the user session directive.

24. The computer program product of claim 23 wherein computer program instructions for sending an HTTP response message containing a value instructing a proxy web security component to implement the user session directive further comprise computer program instructions for inserting the value instructing the proxy web security component to implement the user session directive in a Pragma header field.

* * * * *